United States Patent
Li et al.

(10) Patent No.: US 11,012,342 B2
(45) Date of Patent: *May 18, 2021

(54) SYSTEMS AND METHODS FOR REGULATING NETWORK RESOURCES TO IMPROVE DATA-TRANSMISSION QUALITY

(71) Applicant: RingCentral, Inc., Belmont, CA (US)

(72) Inventors: Xiaoming Li, Cupertino, CA (US); Santosh Panattu Sethumadhavan, San Jose, CA (US)

(73) Assignee: RingCentrai, IN., Belmont, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 16/374,829

(22) Filed: Apr. 4, 2019

(65) Prior Publication Data

US 2019/0238445 A1     Aug. 1, 2019

Related U.S. Application Data

(63) Continuation of application No. 15/415,144, filed on Jan. 25, 2017, now Pat. No. 10,298,482.

(51) Int. Cl.
*H04L 12/26*     (2006.01)
*H04L 29/08*     (2006.01)
(Continued)

(52) U.S. Cl.
CPC .......... *H04L 43/50* (2013.01); *H04L 41/0896* (2013.01); *H04L 65/403* (2013.01);
(Continued)

(58) Field of Classification Search
CPC .............. G06N 99/005; H04L 41/0896; H04L 41/5025; H04L 43/04; H04L 43/08;
(Continued)

(56) References Cited

U.S. PATENT DOCUMENTS 5,666,481 A     9/1997   Lewis
5,712,856 A *   1/1998   Finney .................... H04L 29/06
                                                                                                             714/44

(Continued)

OTHER PUBLICATIONS

International Telecommunication Union (Aug. 2008), "Objective perceptual multimedia video quality measurement in the presence of a full reference", *Series J: Cable Networks and Transmission of Television, Sound Programme and Other Multimedia Signals—Measurement of the quality service*, 108 pp., J.247, ITU-T Telecommunication Standardization Sector of ITU, Geneva, Switzerland.

(Continued)

*Primary Examiner* — Christopher Biagini
(74) *Attorney, Agent, or Firm* — Finnegan, Henderson, Farabow, Garrett & Dunner LLP

(57) ABSTRACT

Systems and methods are provided for regulating network resources to improve data-transmission quality. In one implementation, a method includes searching one or more computer-readable memory locations for prior-session data that matches current-session data. The prior-session data may comprise information describing a prior data-transmission session and the current-session data may comprise information describing a current data-transmission session. Data describing a cause of transmission degradation may be stored in association with the prior data-transmission session. The method may also include identifying, by at least one processor, the cause of transmission degradation in the prior data-transmission session as being a cause of transmission degradation in the current data-transmission session if the prior-session data matches the current-session data. The method may also include initiating correction of the cause of transmission degradation based on the identification.

38 Claims, 7 Drawing Sheets

(51) Int. Cl.
  *H04L 12/24* (2006.01)
  *H04L 29/06* (2006.01)
(52) U.S. Cl.
  CPC .............. *H04L 65/80* (2013.01); *H04L 67/10* (2013.01); *H04L 67/14* (2013.01); *H04L 43/08* (2013.01)
(58) Field of Classification Search
  CPC ......... H04L 43/50; H04L 45/28; H04L 47/10; H04L 47/125; H04L 47/822; H04L 65/80; H04L 67/10; H04L 67/14
  See application file for complete search history.

(56) References Cited

U.S. PATENT DOCUMENTS

| | | | |
|---|---|---|---|
| 6,353,902 B1 | 3/2002 | Kulatunge et al. | |
| 9,088,768 B1 | 7/2015 | Bordner-Babayigit et al. | |
| 2005/0141493 A1 | 6/2005 | Hardy et al. | |
| 2007/0147271 A1* | 6/2007 | Nandy | H04L 43/0876 370/254 |
| 2008/0040496 A1 | 2/2008 | Zhao et al. | |
| 2009/0201935 A1 | 8/2009 | Hass et al. | |
| 2010/0057851 A1* | 3/2010 | Ionescu | H04L 65/1006 709/204 |
| 2012/0054554 A1 | 3/2012 | Dagan | |
| 2012/0136816 A1* | 5/2012 | Kings | H04L 41/147 706/12 |
| 2012/0294164 A1 | 11/2012 | Leventu | |
| 2014/0019636 A1* | 1/2014 | Abela | H04L 29/08081 709/231 |
| 2015/0056960 A1 | 2/2015 | Egner et al. | |
| 2015/0074035 A1 | 3/2015 | Narasappa | |
| 2015/0142146 A1 | 5/2015 | Dunne et al. | |
| 2017/0019312 A1 | 1/2017 | Meyer et al. | |
| 2017/0126475 A1 | 5/2017 | Mahkonen et al. | |

OTHER PUBLICATIONS

International Telecommunication Union (Sep. 2014), "Perceptual objective listening quality assessment", *Series P: Terminals and Subjective and Objective Assessment Methods—Methods for objective and subjective assessments of speech quality*, 82 pp., P.863, ITU-T Telecommunication Standardization Sector of ITU, Geneva, Switzerland.

International Telecommunication Union (Jun. 2015), "The E-Model: a computational model for use in transmission planning", *Series G: Transmission Systems and Media, Digital Systems and Networks—International telephone connections and circuits—Transmission planning and the E-model*, 30 pp., G.107, ITU-T Telecommunication Standardization Sector of ITU, Geneva, Switzerland.

* cited by examiner

SYSTEMS AND METHODS FOR REGULATING NETWORK RESOURCES TO IMPROVE DATA-TRANSMISSION QUALITY

CROSS-REFERENCE TO RELATED APPLICATIONS

This application is a continuation of U.S. application Ser. No. 15/415,144, filed on Jan. 25, 2017, the content of which is hereby incorporated by reference in its entirety.

TECHNICAL FIELD

The present disclosure relates generally to the field of managing network resources and, more specifically, to systems and methods for regulating network resources to improve data-transmission quality.

BACKGROUND

Communication and data transmission over cloud-based networks has proliferated business and personal activities. Cloud-networking architectures have reduced users' capital and maintenance costs associated with network infrastructures by providing users with centralized computing resources that are shared by the cloud provider's clients. Such resources may include applications, servers, data storage, etc. While more users access the centralized resources and require faster transmission of more data with fewer errors and interruptions, cloud providers compete for customers by attempting to maximize the quality of their clients' user-experiences. When a data-transmission session exhibits problems, such as slow speeds or transmission errors, cloud vendors may take corrective action to prevent or mitigate such problems in the future. Such corrective action may include adjusting or regulating network resources in a manner that will prevent or mitigate the problem. In some cases, however, it may be unclear which network resources to regulate to mitigate a given problem or it may be unclear how to regulate the relevant resource to mitigate a given problem.

Accordingly, methods and systems are needed for regulating network resources to improve data-transmission quality.

SUMMARY

Presently disclosed embodiments are directed to communication systems and methods for regulating network resources to improve data-transmission quality.

In one embodiment, a computer-implemented method includes searching one or more computer-readable memory locations for prior-session data that matches current-session data. The prior-session data may comprise information describing a prior data-transmission session and the current-session data may comprise information describing a current data-transmission session. Data describing a cause of transmission degradation may be stored in association with the prior data-transmission session. The method may also include identifying, by at least one processor, the cause of transmission degradation in the prior data-transmission session as being a cause of transmission degradation in the current data-transmission session if the prior-session data matches the current-session data. The method may also include initiating correction of the cause of transmission degradation based on the identification.

In another embodiment, a system for regulating network resources to improve data-transmission quality includes at least one memory device storing computer-executable instructions and at least one processor configured to execute the stored instructions to search one or more computer-readable memory locations for prior-session data that matches current-session data. The prior-session data may comprise information describing a prior data-transmission session and the current-session data may comprise information describing a current data-transmission session. The data describing a cause of transmission degradation may be stored in association with the prior data-transmission session. The at least one processor may be configured to execute the stored instructions to identify, by at least one processor, the cause of transmission degradation in the prior data-transmission session as being a cause of transmission degradation in the current data-transmission session if the prior-session data matches the current-session data. The at least one processor may be configured to execute the stored instructions to initiate correction of the cause of transmission degradation based on the identification.

In another embodiment, a non-transitory computer-readable medium stores instructions executable by at least one processor to facilitate regulating network resources to improve data-transmission quality according to a method. The method includes searching one or more computer-readable memory locations for prior-session data that matches current-session data. The prior-session data may comprise information describing a prior data-transmission session and the current-session data may comprise information describing a current data-transmission session. Data describing a cause of transmission degradation may be stored in association with the prior data-transmission session. The method may also include identifying, by at least one processor, the cause of transmission degradation in the prior data-transmission session as being a cause of transmission degradation in the current data-transmission session if the prior-session data matches the current-session data. The method may also include initiating correction of the cause of transmission degradation based on the identification.

The foregoing general description and the following detailed description are explanatory only and are not restrictive of the claims.

BRIEF DESCRIPTION OF THE DRAWINGS

The accompanying drawings, which are incorporated in and constitute a part of this disclosure, illustrate several embodiments and, together with the description, serve to explain the disclosed principles. In the drawings.

DETAILED DESCRIPTION

Figure 1:
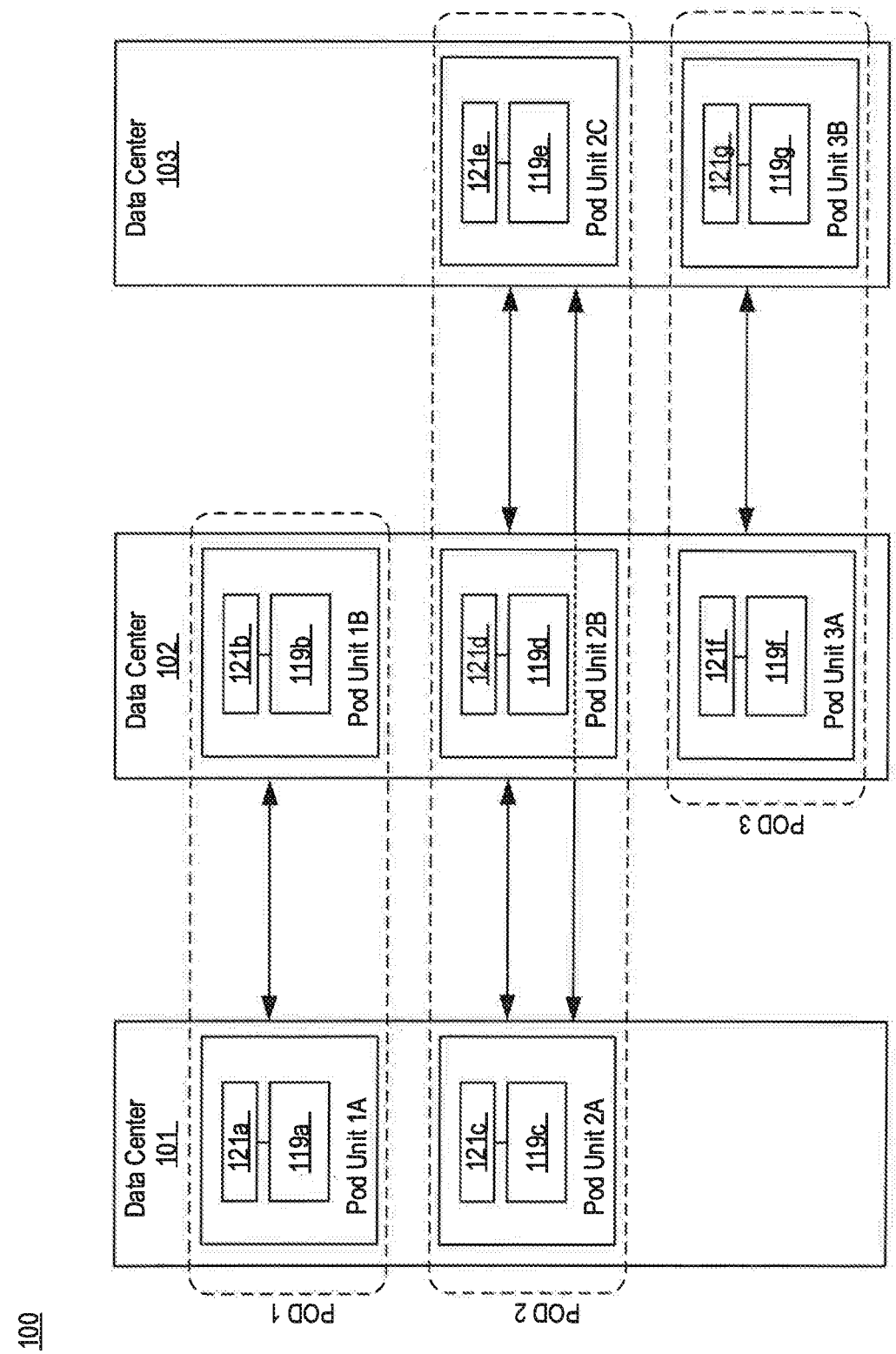
FIGS. 1 and 2 are diagrams of example communication systems in which various implementations described herein may be practiced.

As described in more detail below, the disclosed embodiments are directed to communication systems and methods for regulating network resources (e.g., cloud-network resources) to improve clients' user-experiences. Client user-experience may be based on any user-subjective metric (e.g., mean-opinion score) or objective metric (e.g., packet loss). When a data-transmission session exhibits problems, such as slow speeds or transmission errors, cloud vendors may take corrective action to prevent or mitigate such a problem in the future. Such corrective action may include adjusting or regulating network resources in a manner that will prevent or mitigate the problem. In some cases, however, it may be unclear which network resources to regulate to mitigate a given problem or it may be unclear how to regulate the relevant resource to mitigate a given problem and improve data-transmission quality.

More specifically, the disclosed embodiments provide systems and methods for regulating network resources to improve data-transmission quality. The methods may include running a plurality of test video streams while introducing problems on a test network to determine how much transmission degradation occurs and what corresponding network parameters are measured a plurality of network segments. This information may be used to create a state machine that will receive as an input session profile data and output the probability of a problem occurring at a network segment. Also, a plurality of client video-streaming sessions may have their profiles and corresponding network parameters run through the state machine. If the state machine determines that these sessions have a high probability of a problem occurring at a particular segment, the cloud-vendor may attempt to determine the cause of the problem. Over time, a database of session profiles with high probabilities of problems and corresponding problem causes may be built. This database may be used for future video-streaming sessions. For example, if a current video-streaming session profile is passed through the state machine and the state machine determines a high probability of a problem, the session profile may be compared to those in the database (i.e., those which had their problem causes already determined), allowing the cloud-vendor not to determine the problem cause of the current session by assuming that the current session has the same problem cause as the matching session in the database. The cloud-provider may then regulate network resources manually, automatically, or by adjustments to improve the network parameters for the current session.

The foregoing features provide several advantages over systems and methods that do not follow the disclosed methods when regulating network resources to improve data-transmission quality. For example, systems and methods disclosed herein may be used to automate a network-regulating system, allowing personnel resources to be expended elsewhere.

Reference will now be made in detail to methods and specific implementations that seek to address problems discussed above. Examples of these implementations are illustrated in the accompanying drawings. It should be noted that these examples are described for illustrative purposes and are not intended to limit the scope of this disclosure. Rather, alternatives, modifications, and equivalents of the described implementations are included within the scope of this disclosure as provided by the appended claims. In addition, specific details may be provided in order to promote a thorough understanding of the described implementations. Some implementations within the scope of this disclosure may be practiced without some or all of these details. Further, well known features may not have been described in detail for the sake of clarity.

The example embodiments disclosed herein include computer-implemented methods, non-transitory computer-readable mediums, and systems. The computer-implemented methods may be executed, for example, by at least one processor of a server that executes instructions stored in a non-transitory computer-readable storage medium. As used herein, a non-transitory computer-readable storage medium includes various types of memory such as, for example, a flexible disk, hard disk, solid state drive, magnetic tape, or any other magnetic data storage medium, a CD-ROM, any other optical data storage medium, a RAM, a PROM, and EPROM, a FLASH-EPROM or any other flash memory, NVRAM, a cache, a register, any other memory chip or cartridge, and networked versions of the same. Singular terms, such as "memory" and "computer-readable storage medium," can additionally refer to multiple structures, such a plurality of memories or computer-readable storage mediums. As referred to herein, a "memory" may comprise any type of computer-readable storage medium unless otherwise specified. A computer-readable storage medium may store instructions for execution by at least one processor, including instructions for causing the processor to perform steps or stages consistent with the embodiments described herein, Additionally, one or more computer-readable storage mediums may be used to implement a computer-implemented method: The term "computer-readable storage medium" should be understood to include tangible items and exclude carrier waves and transient signals.

FIG. 1 depicts an example of a communication system 100 in which the disclosed embodiments for regulating network resources to improve data-transmission quality may be implemented. System 100 may include, for example, a telephony system such as a hosted Private Branch Exchange (PBX) platform that provides voice and/or video over IP, fax services, etc. In some examples, one or more components of communication system 100, such as data centers 101, 102, and 103, may be used to implement computer programs, applications, methods, processes, or other software to perform the described network-regulating methods and to realize the structures described herein.

As shown in FIG. 1, communication system 100 includes data centers 101, 102, and 103. Each data center may constitute a point of presence (POP) that includes one or more network computing resources (e.g., servers, routers, switches, network connections, storage devices, etc.) for supporting the services provided by communication system 100. For example, one or more of the data centers 101, 102, and 103 may include a server for regulating network resources to improve data-transmission quality. In some embodiments, one or more of the data centers may be located in a different geographical region.

In the example embodiment depicted in FIG. 1, communication system 100 includes three user points of data referred to as performance optimized datacenters (or pods), i.e., pods 1, 2, and 3, each of which may be a logical grouping of two or more pod units situated in different data centers. In other embodiments, the number of pods may be greater or fewer, depending on implementation-specific considerations. Each pod may serve a different subset of user accounts. In one example, each pod unit (e.g., pod unit 2A) may serve the same subset of users as the other pod units within the same pod (e.g., pod units 2B and 2C). One or more pod units may include a communication server 119a-g configured to provide substantially the same services to the same subset of users as the other pod units within the same pod.

One or more pod units may also include an account database 121a-121g configured to support the respective communication servers for its corresponding subset of users. It should be noted that the term "user" may refer to any of a variety of entities that may be associated with a subscriber account such as, for example, a person, an organization, an organizational role within an organization, a group within an organization, etc. As described in more detail below, one or more of communication servers 119a-g may be configured to implement one or more of the network-regulating methods disclosed herein.

Figure 2:
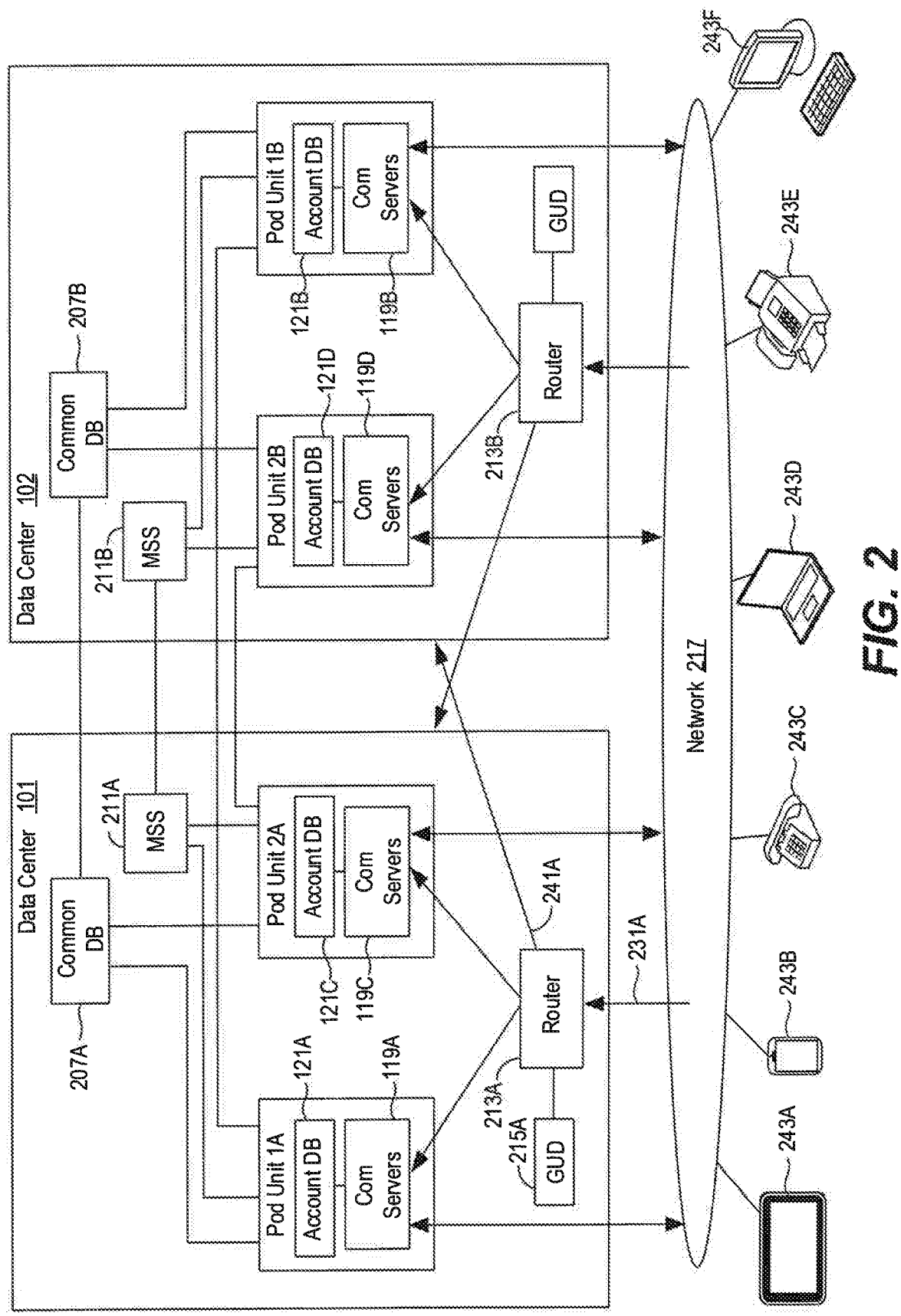

FIG. 2 illustrates various components of communication system 100. In some examples, one or more components of communication system 100, such as data centers 101 and 102, and/or communication endpoints 243A-243F may be used to implement computer programs, applications, methods, processes, or other software to perform network-regulating methods described herein. Specifically, FIG. 2 shows various interconnections within and between data centers 101 and 102. For example, both data centers 101 and 102 are in communication with a network 217. Service requests from various communication endpoints 243A-243F may be routed through network 217 to either or both of the data centers. Communication endpoints 243A-243F may represent a diversity of client devices that connect with a services system designed in accordance with one or more implementations, as described herein. Such client devices may include, for example, cell phones, smart phones, tablets, laptop and desktop computers, conventional telephones, VoIP phones, teleconferencing devices, videoconferencing devices, set top boxes, gaming consoles, etc. Reference to specific client device types should, therefore, not be used to limit the scope of the present disclosure.

Data center 101 includes pod units 1A and 2A, a common database (CDB) 207A, a message storage system (MSS) 211A, a router 213A, and a global user directory (GUD) 215A. Additional pod units (not shown) may also be included in data center 101. Data center 102 is similarly configured and includes components that may operate substantially the same as those in data center 101. In some embodiments, data centers 101 and 102 may provide backup and redundancy to one another in the event of failure.

Communication servers 119A-D may provide multimedia services (e.g., VoIP, video, email, and/or facsimile) to subsets of users. Each one of communication servers 119A-D may also provide other services including, for example, user account management and configuration, billing services, accounting services, etc. As described in more detail below, communication servers 119A-D may provide network resources in response to receiving a service request 231A (e.g., a HTTP request, a SIP request, a RTP request, etc.) routed from router 213A. The network resources may be provided for the signaling and controlling of a multimedia communication session (e.g., a RTP session).

The network resources may also process multimedia communication sessions. The processing may include, for example, buffering incoming data packets in a queue before processing the packets, transcoding audio packets using different codecs to reduce the size of audio packets in view of network conditions, adding application-specific effects to the audio data (e.g., by adding a dial-tone to mimic a telephone call), etc. Each pod unit may also include an account database (e.g., account database 121A) to support the communication server(s) for that particular pod unit, storing configuration details and other information regarding each user's account.

Pod units 1A and 1B may communicate with one another so that the data on their respective account databases are synchronized across data centers. For example, data center 101 may include router 213A to receive incoming service request 231A from network 217. Router 213A may parse the incoming service request to identify or extract a user key, which can be any data or data sequence used to identify a user. The incoming service may also include other information. For example, the incoming service request may include a Session Initiation Protocol (SIP) request, which may include a telephone number of the called party, and router 213A may parse the service request to extract the telephone number. From the telephone number, router 213A may determine, for example, a geographical location associated with the service request.

Using information extracted from an incoming service request, router 213A may query GUD 215A to determine which pod is associated with the user key and/or with the geographical location. Depending on the querying result, router 213A may route the service request to data center 101, or another data center (e.g., data center 102 as indicated by arrow 241A).

Each pod unit of the data center 101 may also be coupled to MSS 211A. MSS 211A may store data (e.g., files) associated with the users served by pod units 1A and 2A. The stored data may include, for example, messages (e.g., voicemails and facsimiles), user logs, system messages, system and user call prompts (e.g., auto-attendant or user-recorded greetings), and other types of call-related or electronic messages. The contents of MSS 211A may be synchronized with other data centers (e.g., synchronized with MSS 211B of data center 102).

In some embodiments, data centers 101 and 102 may be configured to provide a predetermined quality of service for a multimedia session. The multimedia session may be an audio or voice session, a video session, a mixed media session, or any other type of multimedia session known to one of ordinary skill in the art. During the multimedia session, one or more data packets may be exchanged, for example, between at least two of the communication endpoints 243A-243F, with each data packet carrying data relevant to the type of multimedia session (e.g., an audio session may include audio or voice information in the data packets). For example, when a videoconferencing service is provided, data centers 101 and 102 may provide a predetermined quality of videoconferencing service between at least two of communication endpoints 243A-243F as data packets are exchanged between the endpoints. The quality of the videoconferencing service may be defined as a measurable level of videoconferencing service delivered to the communication endpoints 243A-243F, and may depend on system and/or network configuration characteristics. Further, the quality of the service may be affected by various metrics, such as digital signal processing capability of one or more communication servers 119A-D, performance of various network elements such as routers 213A-B etc.

Additionally, network 217 may contribute to a certain probability of packet loss, latency (or latency variation), jitter, burstiness of loss, etc., which may be determined by standards (e.g., LTE, 3G, etc.) and/or protocols (e.g., TCP/IP, ATM, etc.) associated with network 217. Moreover, the physical distances from data centers 101 and 102 to the communication endpoints 243A-243F may further exacerbate packet loss and latency when the data packets are routed over a long distance (e.g., hundreds of miles, thousands of miles, etc.) and/or through a large number of network elements. Furthermore, the processing capacity of communication servers 119A-D, as well as communication endpoints 243A-243F, may affect the speed of processing of the data packets transmitted through network 217. One or more of the aforementioned properties may contribute to a data packet loss rate and/or perceived latency in transmission of video and/or audio data, which in turn may affect the perceived quality of the videoconferencing service. In some embodiments, the perceived quality of the videoconferencing service may be estimated by one or more processors based on, for example, one or more application level metrics that may change throughout a communication session. For instance, in certain embodiments, the server in one or more of data centers 101-103 may perform this estimation.

Video and audio information is typically digitized and compressed with a particular codec into data packets for transmission over network 217. As described above, communication servers 119A-D may transcode video data using different codecs (i.e., devices or programs capable of encoding or decoding a digital signal). In some embodiments, a codec may be selected based on a tradeoff between quality and bandwidth requirements. For example, the H.264 codec operates at a lower bit rate and has low network bandwidth requirement, but offers reduced video quality as compared to, for example, the H.265 codec, which operate at higher bit rates and offer better video quality but also has higher network bandwidth requirements. Also, the H.265 codec is typically more computation intensive than the H.264 codec. Based on the available network bandwidth and computation power, communication servers 119A-D may be configured to switch between codecs as they process the video and/or data packets.

Communication servers 119A-D may be configured to implement certain queue management policies. For example, communication servers 119A-D give priority to certain data packets and/or drop low-priority data packets when the queue depth reaches a certain level. Further, communication servers 119A-D may include one or more servers configured to regulate network-resources throughout a communication session. The use of network-resource regulation increases the likelihood that a greater number of data packets reach their destination, which results in a higher QoS for the end user.

Moreover, data centers 101 and 102 may be configured to provide a pre-determined quality of videoconferencing service for a particular user device. For example, a user who operates one of communication endpoints 243A-243F may subscribe to a specific videoconferencing plan under which the user is to be provided with a pre-determined quality of videoconferencing service. Based on the videoconferencing plan, a certain cost may be allocated to provisioning the subscribed service. The videoconferencing plan and cost information may be part of user account information stored, for example, in account databases 121a-d. This information may be accessed by the server and taken into account when determining how to regulate network resources. For example, the server may regulate network resources to improve data-transmission quality throughout a communication session until an estimated QoS consistent with the user's plan is achieved.

Figure 3:
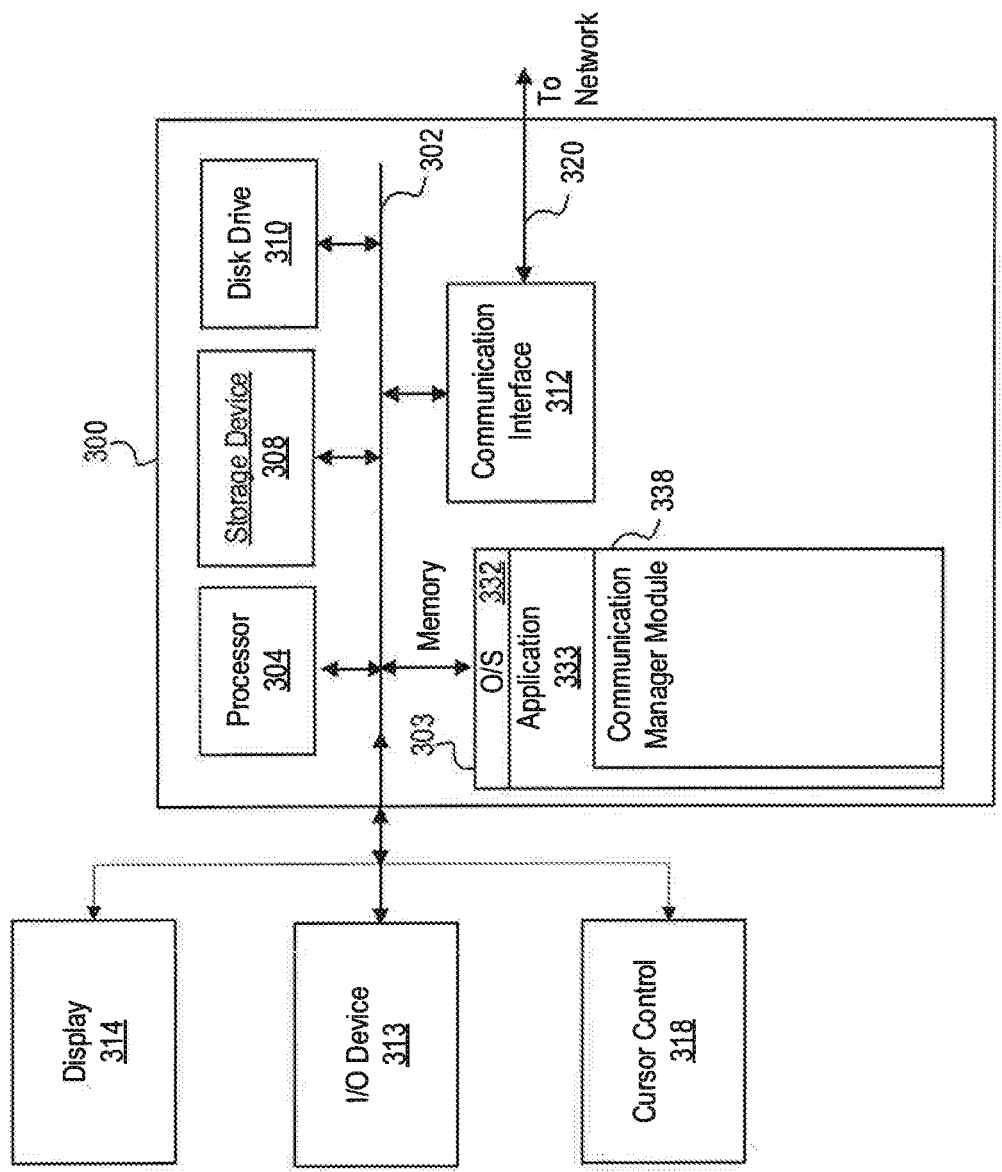
FIG. 3 is a diagram of an example system architecture for implementing embodiments consistent with the present disclosure.

FIG. 3 is a block diagram of an example system 300 that may be part of a communication device used in a communication system capable of functioning as any of the communication devices depicted in FIG. 2 (e.g., communication endpoints 243A-243F, communication servers 119a-119g, router 213A, etc.) and/or implementing the functionalities described above with respect to such devices. System 300 may include a bus 302 or other communication mechanism for communicating information. Bus 302 interconnects subsystems and devices, such as one or more processors 304, system memory ("memory") 303, storage device 308 (e.g., ROM), disk drive 310 (e.g., magnetic or optical), communication interface 312 (e.g., a modem, Ethernet card, or any other interface configured to exchange data with a communications network), display 314 (e.g., CRT or LCD), input/output device 313 (e.g., keyboard), and pointer cursor control 318 (e.g., mouse or trackball).

In some embodiments, system 300 may perform specific operations in which processor 304 executes one or more sequences of one or more instructions stored in system memory 303. Such instructions can be read into system memory 303 from another computer readable medium, such as static storage device 308 or disk drive 310. In some examples, hard-wired circuitry can be used in place of or in combination with software instructions for implementation. In the example shown, system memory 303 may include modules of executable instructions for implementing an operation system ("O/S") 332, an application 333, and/or a communication manager module 338, which can provide functionalities disclosed herein.

In some embodiments, execution of the sequences of instructions is performed by a single computer system 300. In other embodiments, two or more computer systems 300 coupled by communication link 320 (e.g., links to LAN, PSTN, or wireless network) perform the sequence of instructions in coordination with one another. Computer system 300 may transmit and receive messages, data, and instructions, including program code (i.e., application code) through communication link 320 and communication interface 312. Received program code may be executed by processor 304 as it is received, and stored in disk drive 310 or other non-volatile storage for later execution.

In some examples, where system 300 is part of the systems described above, storage device 308 may store data structures for storing a set of application-level metrics with their associated weights and values, and for storing descriptors of the set of metrics with their associated weights and values at a given time period during a communication session. For example, storage device 308 may store a table that associates a set of application-level network metrics with a weight and a set of corresponding values. One or more of the corresponding values may be associated with a certain level of network performance measured by the network metrics. The one or more values may reflect a predicted quality of service. In an embodiment, a higher score may indicate a higher predicted quality of service and may be associated with data that indicates better performance. For example, the bandwidth of a network may be associated with a weight of 15% and a value of 1 if the bandwidth is equal to 128 kbps or a value of 2 if the bandwidth is equal to 2 Mbps, Higher values may be assigned to networks of more efficient types, with lower jitter, lower latency, lower packet-loss rate, and/or more reliable carriers. The combined weight of some network metrics may reflect that those network metrics exert a larger influence on the quality of multimedia service than other metrics.

Storage device 308 may store associated network element configuration settings. Application 333 may receive a request for network resources for a communication session (e.g., an RTP session) via bus 302 and communication interface 312. If a participant to the communication session has subscribed to a certain quality of service for the session, application 333 determines a set of configuration settings expected to achieve the subscribed quality of service, Application 333 may also collect RTCP App packets via bus 302 and communication interface 312 to receive a packet duplication model for the given device at a given time point.

Figure 4:
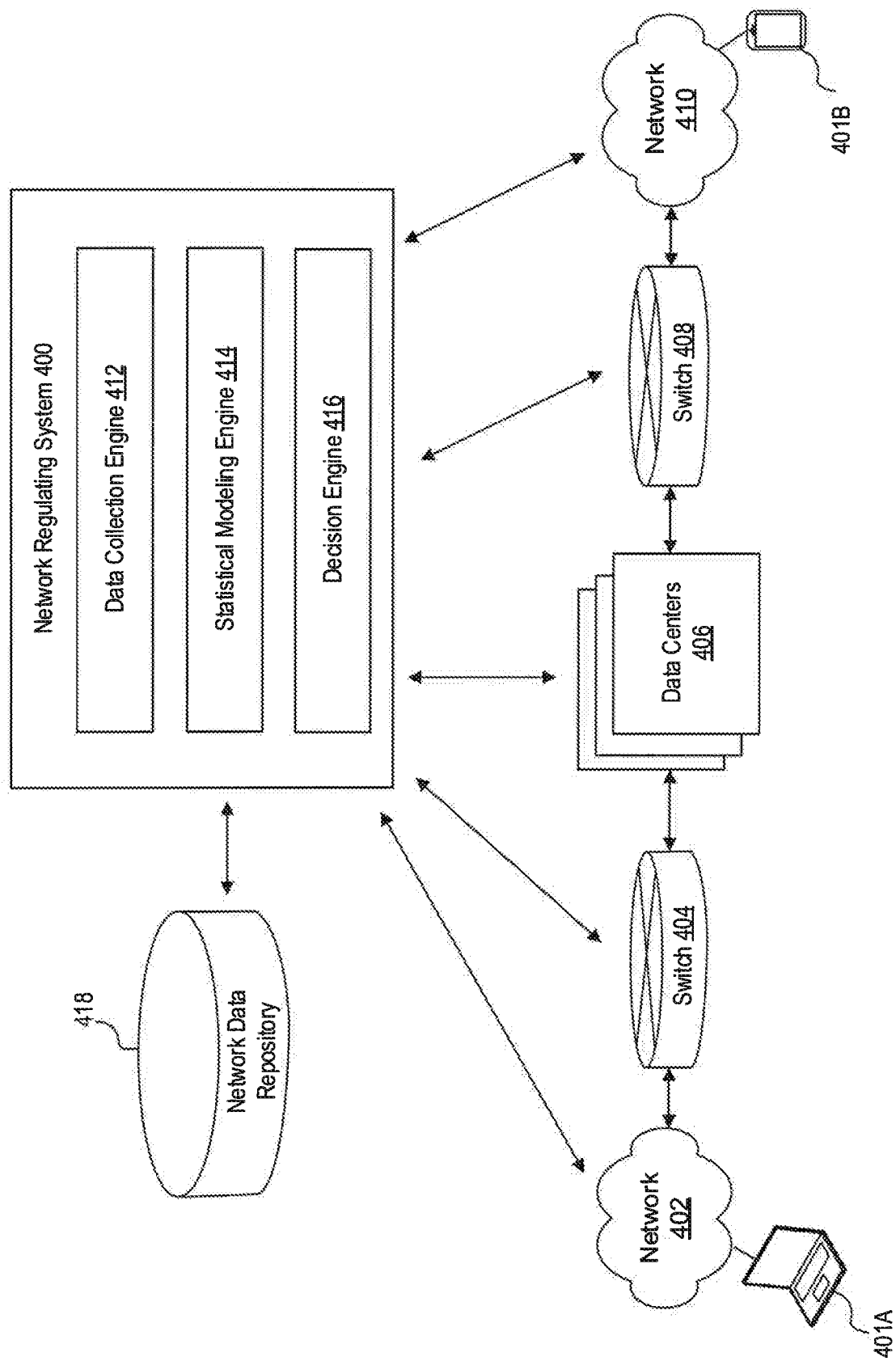
FIG. 4 is a component diagram of an example system environment for providing and managing network resources for multimedia service, consistent with disclosed embodiments.

FIG. 4 is a block diagram of an example system 400 for regulating network resources to improve data-transmission quality, consistent with disclosed embodiments. As shown in FIG. 4, system 400 may include network elements such as data collection engine 412, statistical modeling engine 414, and decision engine 416, which may be communicatively connected to network data repository 418, data centers 406, and switches 404 and 408. Network elements such as data collection engine 412, statistical modeling engine 414, and decision engine 416 may, in certain embodiments, be connected to communication endpoints 401A and 401B through switches 404 and 408, respectively. Endpoints 401A and 401B may include any of the endpoints 243A-243F of FIG. 2. In a case where a videoconferencing session is established under RTP between endpoints 401A and 401B, network 402 is an IP network, while switch 404 include a session border control (SBC) and a SIP proxy and registrar. Switch 404 may be configured to route the media data to at least one of data centers 406, or to other data centers or to other network elements not shown in FIG. 4.

In some embodiments, data centers 406 may include data centers 101 and/or 102 of FIG. 2, and may further include various communication servers configured to route and process the media data for the videoconferencing session. Switch 408 may include an interconnect SBC and a PSTN gateway configured to route the processed media data from data centers 406 to endpoint 401B via network 410, which may include a PSTN network. System 400 can be further configured to manage the configuration settings, such as regulating resources for the network elements of FIG. 4 to achieve a predetermined quality of service for the videoconferencing session.

As shown in FIG. 4, system 400 may include a data collection engine 412, a statistical modeling engine 414, and a decision engine 416, each of which may include a hardware module designed for use with other components or a part of a program that performs a particular function. Data collection engine 412 collects data during a communication session, such as the network, device, and server metrics discussed above, as well as the overall QoS score calculated for one or more time points during a communication session. The dynamic data provides statistical modeling engine 414, which can use previously-collected dynamic data from one or more prior sessions to construct a statistical model including various parameters for resource regulation for a given communication session. The statistical model may be updated over time as more sessions use an embodiment of this disclosure.

The dynamically acquired data metrics, as well as the statistical models, may be provided to decision engine 416, which may determine how to regulate network resources to improve data-transmission quality between endpoints 401A and 401B.

The dynamically acquired data, the statistical models, and/or configuration settings, may be stored in a repository 418, which provides historical data to statistical modeling engine 414 for use in future communication sessions. In some embodiments, repository 418 may be organized with an Apache™ Hadoop® File System (HDFS).

Figure 5A:
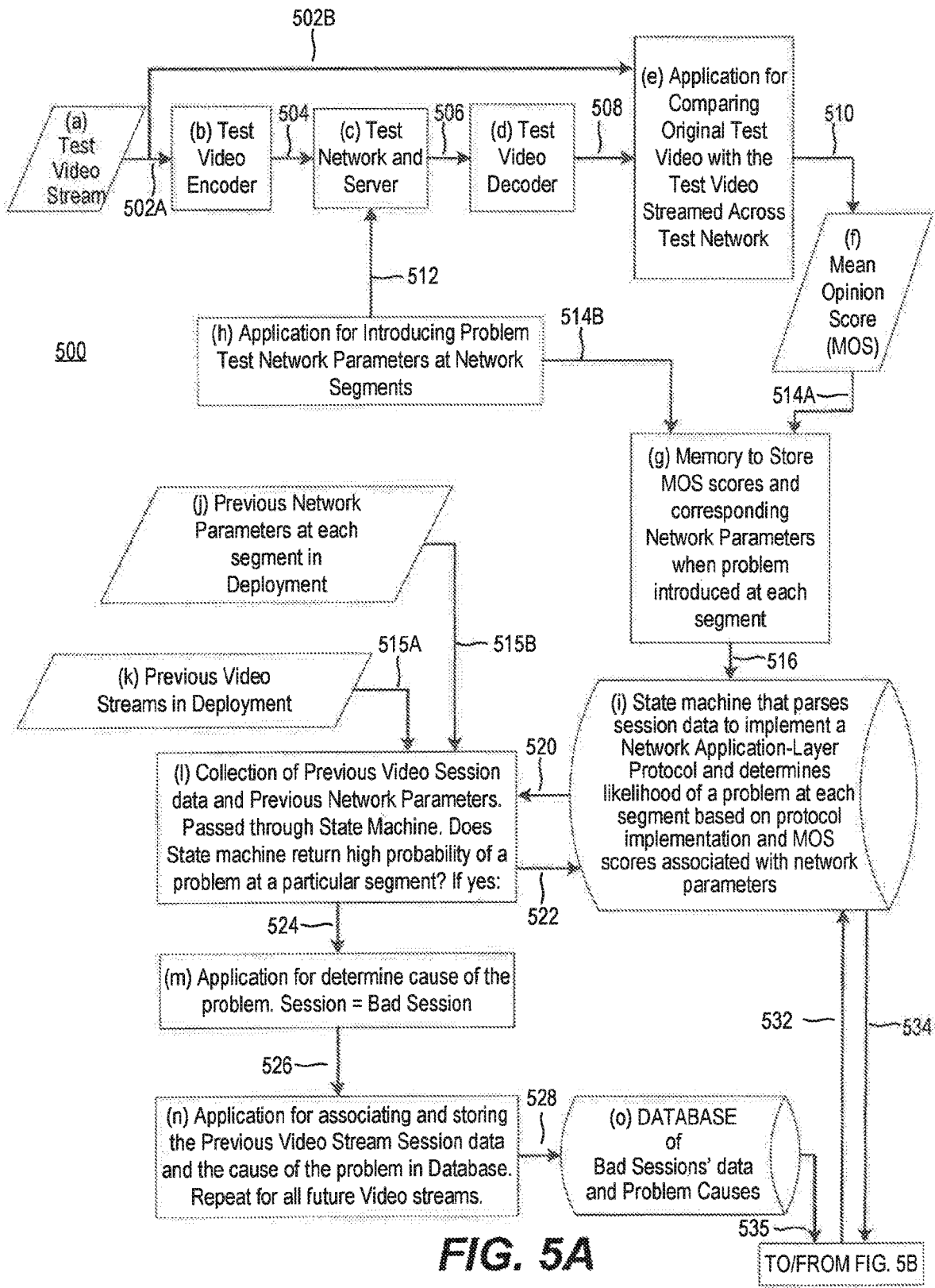
FIGS. 5A and 5B show a system flow diagram illustrating an example of a method for regulating network resources to improve data-transmission quality.
Figure 5B:
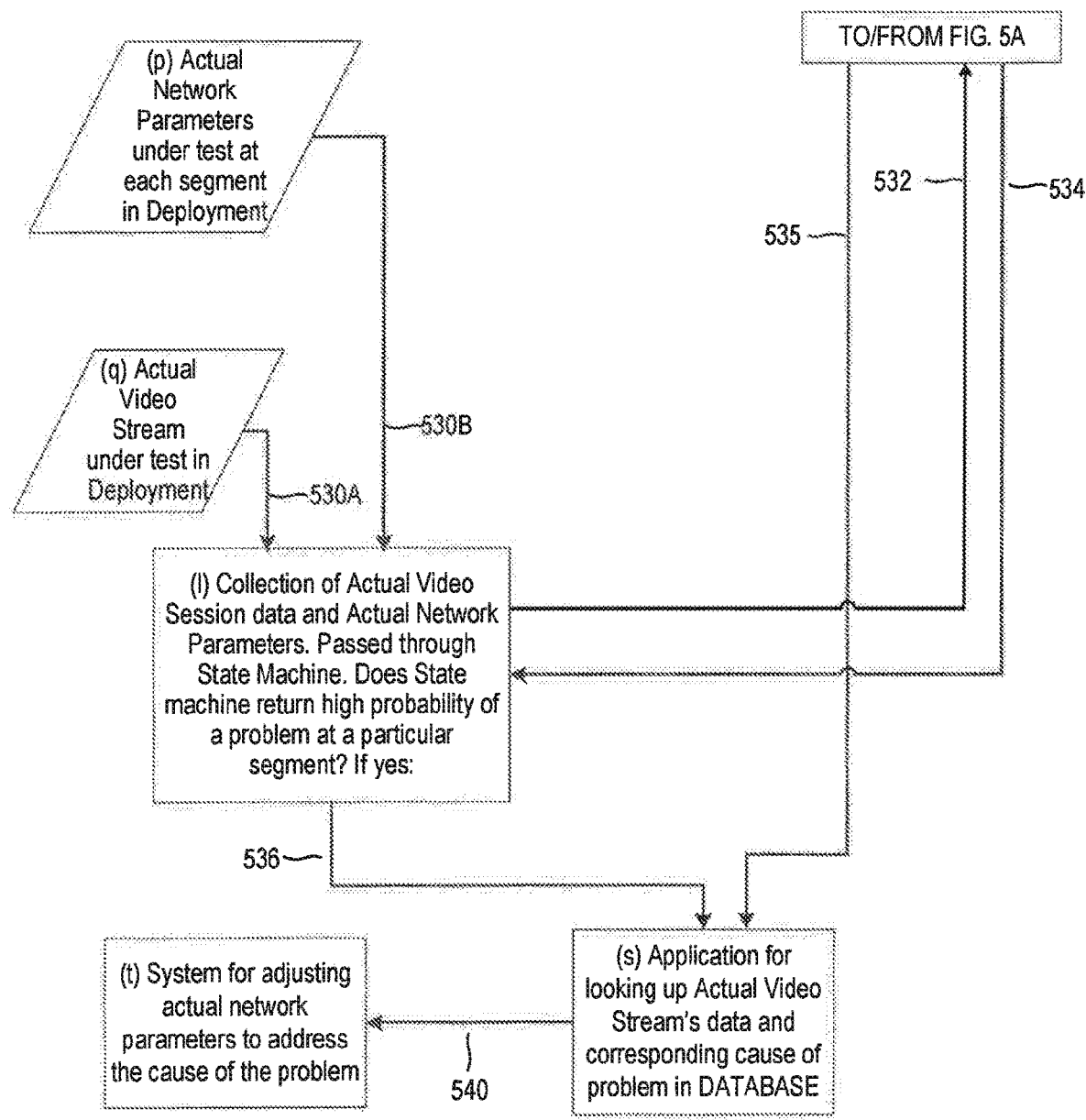

In some embodiments, it may be desirable to regulate network resources to improve data-transmission quality across network 217. FIGS. 5A and 5B are system flow diagrams illustrating an exemplary method 500 of regulating network resources that a server located, for example, in one or more of data centers 101-103 may use to improve data-transmission quality during at least a portion of a communication session.

Method 500 may comprise simulating data transmission across a network while introducing problems in the network and collecting the resulting network parameters and transmission-quality metrics. For example, at step 502A, a test video stream may be provided to a test video encoder for encoding. At step 502B, the test video stream may be provided to an application for comparison to a test video stream that has been encoded, passed through a test network, and decoded. In some embodiments, the test video streams in steps 502A and 502B may be provided by communication endpoint 243F. The test video encoding may comprise compressing the video stream and/or formatting it for transmission across a test network through a test server. An encoding method used may be consistent with methods described by known standards such as ITU-T H.264. At step 504, the encoded test video stream may be sent across a test network through a test server and received by a test video decoder at step 506. The test network may be a virtual-network version or emulation of a deployed network used by cloud-provider customers. In certain embodiments, the test network can be the deployed network used by cloud-provider customers. The test network may comprise at least one network segment, such as at least one subnetwork. After receiving the encoded video stream, the test video decoder may decode the received encoded video stream. Decoding the encoded video stream may comprise decompressing it and/or formatting it for at least one comparison to the original test video stream. At step 508, the decoded test video stream may be passed to an application that compares the decoded test video stream to the original test video stream received at step 502B. In some embodiments, the encoded test video stream may be sent, received, and passed to the application by one or more communication servers 119a-119g. The application may compare the two video streams to determine a quality metric to associate with the decoded test video stream that reflects how much degradation the transmission through the test server and test network introduced. A comparison of the original video stream and the decoded video stream may be consistent with methods described by known standards such as ITU-T J.247 or J.149. The quality metric, such as the mean-opinion score, may be produced at step 510. In some embodiments, the quality metric may be produced by communication endpoint 243F. The quality metric may be a mean-opinion score that attempts to estimate a user's subjective perspective on the quality of data transmitted over a network. A mean-opinion score computation may be consistent with methods described by known standards such as ITU-T G.107. The mean-opinion score may be computed at fixed or varying time intervals throughout the test video-stream transmission.

Steps 502A through 510 may be repeated. For at least one repetition of steps 502A through 510, one or more problems may be intentionally introduced in the test network at step 512. In some embodiments, the problems may be introduced by one or more communication servers 119a-119g. The one or more problems may be introduced such that transmission of the encoded test video stream across the network at step 504 may be detrimentally affected by the problems. In certain embodiments, the one or more problems may be introduced at particular network segments. For example, a virtual ISP-gateway buffer, located at the end of a client-to-ISP segment of the test virtual network, may be intentionally decreased to induce packet loss (i.e., when packets of data do not reach their destination). The system may measure various test network parameters once the problem has been introduced, such as the packet loss percentage, jitter, packet delay, etc. At steps 514A and 514B, the mean-opinion score computed when a particular problem was introduced and the test network parameters measured once the problem was introduced may be stored in association with each other. In some embodiments, the mean-opinion score and the test network parameters may be stored by communication endpoint 243F. For at least some repetitions of steps 502A through 510, new problems at the same network segments and problems at other network segments may be introduced and the resulting mean-opinion score and associated test network parameters stored at steps 514A and 514B.

At step 516, the collection of mean-opinion scores and associated test network parameters may be used to create a state machine that implements a communication protocol, such as a WebRTC protocol. A state machine may be a computational model, implemented in hardware and/or software, that may be in a particular state at given time. The state machine may receive inputs and, depending on the inputs, transition from one state to another. The transitions may occur according to certain predefined conditions. The state of the state machine after one or more transitions may be considered an output. In certain embodiments, probabilities may be assigned to transitions from one state to another. The state machine may be a parser that performs syntactic analysis on communication-session data to check for correct syntax and determine the likelihood of an error or problem having occurred, as specified by the relevant communication protocol. The state machine may receive, as an input, communication-session data (i.e., session data) comprising, for example, data describing the processes that occurred during a communication session over a network (i.e., the session profile). The format of the session profile may be specified by a session-description protocol, such as the IETF Session Description Protocol. The session data may, instead or in addition, comprise network parameters collected during the communication session at one or more network segments. After processing the session data, the state machine may indicate the probability that a problem occurred at one or more segments of the network.

At steps 515A and 515B, session data from video streams that previously occurred over a network (i.e., previous-video session data) may be collected and passed through the state machine at step 520. The previous-video session data may comprise, for example, previous-video session profiles and corresponding network parameters at one or more segments of the network. In certain embodiments, previous-video session data may be passed through the state machine at step 520 without first collecting the previous-video session data for one or more previously occurring video streams. At step 522, the state machine may provide a probability of a problem or an error occurring at each segment of the network in the previous video session. The state machine may determine the mean-opinion score for the previous video sessions by finding the test network parameters passed to it in step 516 that are the same or similar to the network parameters for the previous-video sessions. The mean-opinion scores passed to the state machine at step 516 that are associated with the same or similar test network parameters may be used to determine the probabilities of a problem or error at each segment in the network in the previous video session. The determined probabilities may be provided for at least one corresponding previous video session at step 522.

At step 524, the system may analyze the probabilities of problems or errors at network segments of previous video sessions provided at step 522. If the probability of a problem or error occurring at a network segment is above a threshold, a cause of the potential problem or error may be determined. For example, if a high probability of a problem is determined at the client-to-ISP segment of the network, the cloud-provider may attempt to contact the client's ISP and request that they increase the size of the their gateway's packet buffer. This may be characterized as a manual attempt to correct a potential problem. The system may automatically attempt to correct a potential problem and/or make adjustments until a problem is determined to be corrected or mitigated by a first method. If the attempt to correct or mitigate a potential problem with the first method is unsuccessful, another attempt may be performed with a second method. Once a particular method of correcting or mitigating the potential problem causes the probability of the potential problem to decrease below the threshold, the system may associate a cause of the problem with the previous video session profile at step 526 and store the previous video session profile and the associated cause of the problem in a database at step 528. The system may identify the cause of the problem to be that which is directly affected by the successful attempt to correct or mitigate the problem (e.g., if increasing the ISP-gateway buffer size decreases the packet data loss percentage and lowers the probability of a problem or error occurring on the client-to-ISP segment, the cause of the problem may be identified as an insufficient ISP-gateway buffer size.

At steps 530A and 530B of method 500, the illustration of which is continued in FIG. 5B, video-stream data under test (i.e., actual video stream) may be collected for a video stream passing through a network. Actual video-stream data may comprise the actual video-stream session profile and the corresponding network parameters at one or more segments of the network. At step 532, illustrated in FIGS. 5A and 5B, the actual video-stream data may be passed through the aforementioned state machine. In certain embodiments, actual video-stream data may be passed through the state machine at step 532 without first collecting the previous-video session data for one or more previously occurring video streams. At step 534, the state machine may provide the probability of a problem or error at network segments using the foregoing method described with reference to the previous video sessions. At step 536, if the probability of a problem at a network segment is above a threshold, the system may compare the actual video-stream session profile to the previous video session profiles stored in the database. When it finds a previous video session profile that is identical or similar to the actual video-stream session profile, the system may identify the cause of the problem associated with the identical or similar previous video session profiles as the cause of the problem in the actual video-stream at step 538. Video session profiles may be compared using, for example, a sequence-matching algorithm to find a sequence correlation between compared profiles. For example, a sequence-matching algorithm may compare sequences of processes listed in two video session profiles and provide a correlation score based on the length of the longest common sequence within both profiles. The algorithm may, in some embodiments, divide the common-sequence length by the total length of the shorter of the two sequences being compared. In some embodiments, video session profiles may be compared using, for example, machine-learning methods such as a deep learning algorithm. Training of such algorithm may be performed with, for example, data collected from steps 502A through 514B. An attempt to correct the problem may be initiated at step 540 by, for example, attempting to manually correct the problem, attempting to automatically correct the problem, or attempting to make adjustments until the problem is corrected.

One or more of steps 515A through 540 of method 500 may be performed using one or more of common databases 207A and/or 207B, account databases 121a-121g, communication servers 119a-119g, and/or network regulating system 400.

Figure 6:
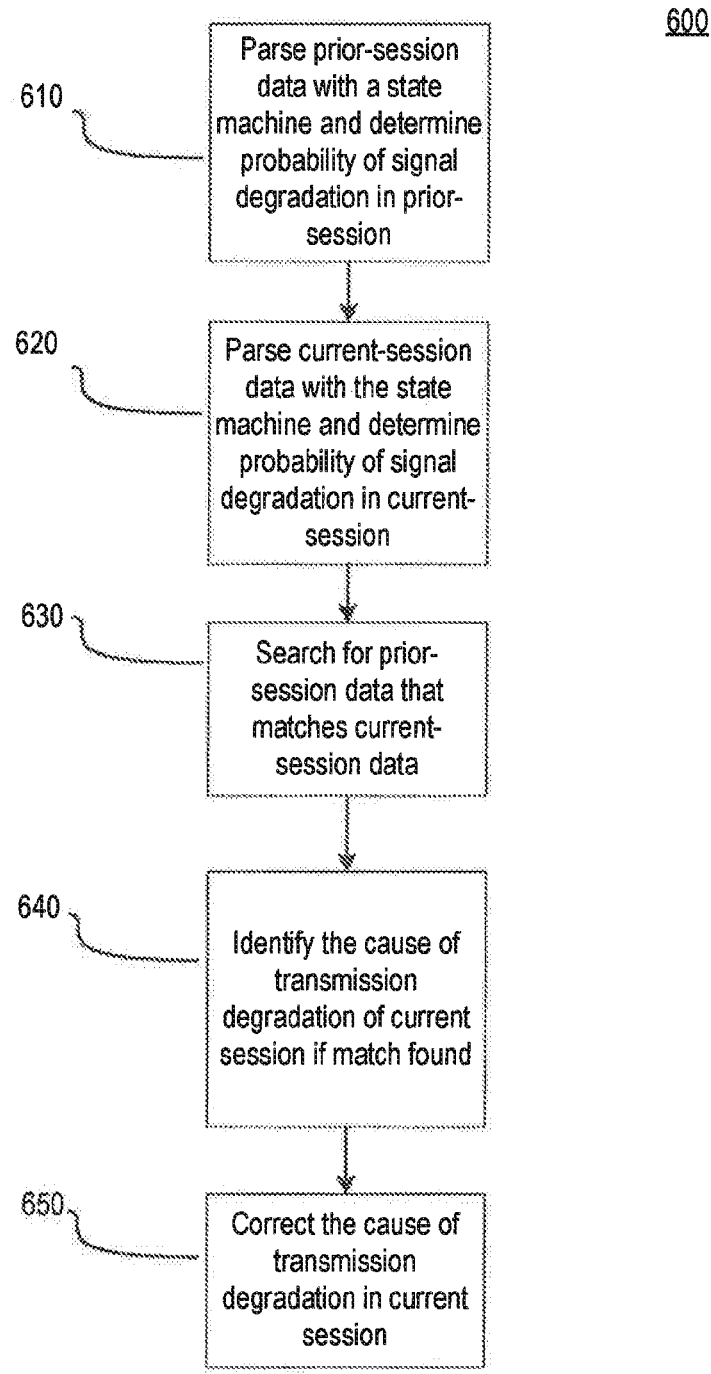
FIG. 6 is a flow chart illustrating an example of a method for regulating network resources to improve data-transmission quality.

FIG. 6 is a flow chart illustrating an exemplary method 600 of regulating network resources that a server located, for example, in one or more of data centers 101-103 may use to improve data-transmission quality during at least a portion of a communication session.

Method 600 may comprise step 610, whereby a system consistent with the present disclosure parses prior-session data with a state machine and determines the probability of signal degradation occurring in a prior session. The prior-session data may be from video streams that previous occurred over a network and may comprise, for example, the previous-video session profiles and corresponding network parameters at one or more segments of the network. At step 620 of method 600, the system consistent with the present disclosure may parse current-session data with the state machine and determine the probability of signal degradation in the current-session. The current-session data may be from video streams under test (i.e., actual video streams) and may comprise, for example, the actual video session profiles and corresponding network parameters at one or more segments of the network. At step 630 of method 600, the system consistent with the present disclosure may search for prior-session data that matches current-session data. The search may be performed, for example in a database storing prior-session data. In certain embodiments, the current-session data need not be identical to the prior-session data to be considered a match. A sufficient similarity between the prior-session data and the current-session data may be considered a match. At step 640 of method 600, the system consistent with the present disclosure may identify the cause of transmission degradation in the current session if a match was found in step 630. The cause of transmission degradation may be that which is associated with the matching prior-session data. At step 650 of method 600, the system consistent with the present disclosure may correct the cause of transmission degradation in the current session. This may occur automatically, manually, or by making adjustments. Examples of corrections may include adjusting network resources to alter network parameters. In certain embodiments, steps 610 and 620 may be excluded from method 600.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the sequence of steps shown in figures are only for illustrative purposes and are not intended to be limited to any particular sequence of steps. As such, those skilled in the art can appreciate that these steps can be performed in a different order while implementing the same method.

It will also be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects. Rather, the scope of this disclosure should be determined with reference to the appended claims.

What is claimed is:

1. A computer-implemented method for regulating network resources to improve data-transmission quality, the method comprising:
  receiving prior-session data and decoded prior-session data, wherein the decoded prior-session data is generated from the prior-session data that has been encoded by a video encoder and subsequently decoded by a video decoder;
  determining one or more quality metrics by comparing the decoded prior-session data and the prior-session data, wherein the one or more quality metrics represent transmission degradation associated with transmission of the encoded prior-session data through a test network;
  determining a network parameter associated with the transmission of the encoded prior-session data through the test network; and
  creating a state machine using the one or more quality metrics and the network parameter;
  performing syntactic analysis of the prior-session data with the state machine to determine a first probability that transmission degradation occurred in a prior data-transmission session;
  performing syntactic analysis of current-session data with the state machine to determine a second probability that transmission degradation occurred in a current data-transmission session;
  searching, by a processor, one or more computer-readable memory locations for prior-session data that matches the current-session data; and
  identifying a cause of transmission degradation in the prior data-transmission session as being the cause of transmission degradation in the current data-transmission session.

2. The method of claim 1, further comprising:
  correcting, by at least one processor, the cause of transmission degradation based on the identification.

3. The method of claim 1, wherein the network parameter comprises at least one of a packet loss percentage, a jitter, a packet delay, or a packet burst.

4. The method of claim 1, wherein the one or more quality metrics comprise one or more mean opinion scores.

5. The method of claim 1, wherein:
  the prior data-transmission session is a data-transmission session occurring across a first network comprising a first set of network segments;
  the current data-transmission session is a data-transmission session occurring across a second network comprising a second set of network segments; and
  one or more quality metrics are associated with segments in the first set of network segments.

6. The method of claim 5, wherein:
  the first network and the second network are the same network; and the first set of network segments and the second set of network segments are the same set of network segments.

7. The method of claim 1, wherein the state machine implements a networking protocol and assigns the first probability and second probability based on the networking protocol and one or more quality-test metrics associated with test-network parameters.

8. The method of claim 7, wherein the one or more quality-test metrics are quantifications of transmission degradation in a test-transmission session across a test network comprising a third set of network segments, and wherein the one or more quality-test metrics are associated with segments in the third set of network segments.

9. The method of claim 1, wherein the state machine comprises one of a hardware computational model or a software computational model.

10. The method of claim 1, wherein the state machine receives an input and outputs a state when the state transits from a previous state in accordance with a predefined condition.

11. The method of claim 1, wherein
performing syntactic analysis of the prior-session data comprises determining whether a syntax of the prior-session data is correct in accordance with a communication protocol; and
performing syntactic analysis of the current-session data comprises determining whether a syntax of the current-session data is correct in accordance with the communication protocol.

12. The method of claim 1, further comprising:
after performing the syntactic analysis of the prior-session data and before performing the syntactic analysis of the current-session data, determining whether the first probability exceeds a threshold; and
if the first probability exceeds the threshold, identifying the cause of transmission degradation in the prior data-transmission session.

13. The method of claim 12, wherein identifying the cause of transmission degradation in the prior data-transmission session comprises:
identifying a candidate cause of transmission degradation at a network segment that transmits the prior data-transmission session;
determining whether a probability that the transmission degradation occurs at the network segment decreases below the threshold after correcting the candidate cause of transmission degradation; and
if the probability that the transmission degradation occurs at the network segment decreases below the threshold after correcting the candidate cause of transmission degradation, determining the candidate cause of transmission degradation as the cause of transmission degradation in the prior data-transmission session.

14. The method of claim 1, wherein searching, by the processor, the one or more computer-readable memory locations for the prior-session data that matches the current-session data comprises:
comparing the prior-session data and the current-session data using at least one of a sequence-matching algorithm or a machine-learning algorithm.

15. The method of claim 14, wherein comparing the prior-session data and the current-session data using the sequence-matching algorithm comprises:
determining a correlation score based on length of the longest common sequence in the prior-session data and the current-session data; and
determining that the prior-session data matches the current-session data based on the correlation score.

16. The method of claim 15, determining the correlation score based on length of the longest common sequence of processes in the prior-session data and the current-session data comprises:
determining the correlation score as a ratio of the length of the longest common sequence over the shorter of a total length of the prior-session data and a total length of the current-session data.

17. The method of claim 1, wherein at least one of the prior-session data or the current-session data comprises video stream data.

18. The method of claim 1, wherein the test network comprises one of a virtual network, an emulation of a deployed network, or the deployed network.

19. The method of claim 1, further comprising:
implementing one or more problems to the test network for detrimentally affecting transmitting the encoded prior-session data through the test network.

20. The method of claim 19, wherein implementing one or more problems to the test network comprises:
implementing the one or more problems to a subnetwork of the test network.

21. The method of claim 20, wherein the subnetwork comprises a client-to-ISP segment, and the one or more problems comprises a packet loss.

22. The method of claim 1, wherein the one or more quality metrics comprises a mean-opinion score.

23. A system for regulating network resources to improve data-transmission quality, the system comprising:
at least one memory device storing computer-executable instructions; and
at least one processor configured to execute the stored instructions to:
receive prior-session data and decoded prior-session data, wherein the decoded prior-session data is generated from the prior-session data that has been encoded by a video encoder and subsequently decoded by a video decoder;
determine one or more quality metrics by comparing the decoded prior-session data and the prior-session data, wherein the one or more quality metrics represent transmission degradation associated with transmission of the encoded prior-session data through a test network;
determine a network parameter associated with the transmission of the encoded prior-session data through the test network; and
create a state machine using the one or more quality metrics and the network parameter;
perform syntactic analysis of the prior-session data with the state machine to determine a first probability that transmission degradation occurred in a prior data-transmission session;
perform syntactic analysis of current-session data with the state machine to determine a second probability that transmission degradation occurred in a current data-transmission session;
search one or more computer-readable memory locations for prior-session data that matches the current-session data; and
identify a cause of transmission degradation in the prior data-transmission session as being the cause of transmission degradation in the current data-transmission session.

24. The system of claim 23, wherein the at least one processor is configured to execute additional stored instructions to:
   correct, by at least one processor, the cause of transmission degradation based on the identification.

25. The system of claim 23, wherein the network parameter comprises at least one of a packet loss percentage, a jitter, a packet delay, or a packet burst.

26. The system of claim 23, wherein the one or more quality metrics comprise one or more mean opinion scores.

27. The system of claim 23, wherein:
   the prior data-transmission session is a data-transmission session occurring across a first network comprising a first set of network segments;
   the current data-transmission session is a data-transmission session occurring across a second network comprising a second set of network segments; and
   one or more quality metrics are associated with segments in the first set of network segments.

28. The system of claim 27, wherein:
   the first network and the second network are the same network; and
   the first set of network segments and the second set of network segments are the same set of network segments.

29. The system of claim 23, wherein the state machine implements a networking protocol and assigns the first probability and second probability based on the networking protocol and one or more quality-test metrics associated with test-network parameters.

30. The system of claim 29, wherein the one or more quality-test metrics are quantifications of transmission degradation in a test-transmission session across a test network comprising a third set of network segments, and wherein the one or more quality-test metrics are associated with segments in the third set of network segments.

31. A non-transitory computer-readable medium storing instructions executable by at least one processor to facilitate regulating network resources to improve data-transmission quality, according to a method, the method comprising:
   receiving prior-session data and decoded prior-session data, wherein the decoded prior-session data is generated from the prior-session data that has been encoded by a video encoder and subsequently decoded by a video decoder
   determining one or more quality metrics by comparing the decoded prior-session data and the prior-session data, wherein the one or more quality metrics represent transmission degradation associated with transmission of the encoded prior-session data through a test network;
   determining a network parameter associated with the transmission of the encoded prior-session data through the test network; and
   creating a state machine using the one or more quality metrics and the network parameter;
   performing syntactic analysis of the prior-session data with the state machine to determine a first probability that transmission degradation occurred in a prior data-transmission session;
   performing syntactic analysis of current-session data with the state machine to determine a second probability that transmission degradation occurred in a current data-transmission session;
   searching one or more computer-readable memory locations for prior-session data that matches the current-session data; and
   identifying a cause of transmission degradation in the prior data-transmission session as being the cause of transmission degradation in the current data-transmission session.

32. The non-transitory computer-readable medium of claim 31, storing instructions executable by at least one processor to facilitate regulating network resources to improve data-transmission quality, according to a method, the method further comprising:
   correcting, by at least one processor, the cause of transmission degradation based on the identification.

33. The non-transitory computer-readable medium of claim 31, wherein the network parameter comprises at least one of a packet loss percentage, a jitter, a packet delay, or a packet burst.

34. The non-transitory computer-readable medium of claim 31, wherein the one or more quality metrics comprise one or more mean opinion scores.

35. The non-transitory computer-readable medium of claim 31, wherein:
   the prior data-transmission session is a data-transmission session occurring across a first network comprising a first set of network segments; and
   the current data-transmission session is a data-transmission session occurring across a second network comprising a second set of network segments.

36. The non-transitory computer-readable medium of claim 35, wherein:
   the first network and the second network are the same network; and
   the first set of network segments and the second set of network segments are the same set of network segments.

37. The non-transitory computer-readable medium of claim 31, wherein:
   the state machine implements a networking protocol and assigns the first probability and second probability based on the networking protocol and one or more quality-test metrics associated with test-network parameters; and
   the one or more quality-test metrics are quantifications of transmission degradation in a test-transmission session across a test network comprising a third set of network segments, and wherein the one or more quality-test metrics are associated with segments in the third set of network segments.

38. The non-transitory computer-readable medium of claim 31, wherein at least one of the prior-session data or the current-session data comprises video stream data.

* * * * *